W. C. BOTSFORD.
AGRICULTURAL TRACTOR.
APPLICATION FILED JAN. 24, 1917.
1,302,295.
Patented Apr. 29, 1919.
2 SHEETS—SHEET 1.
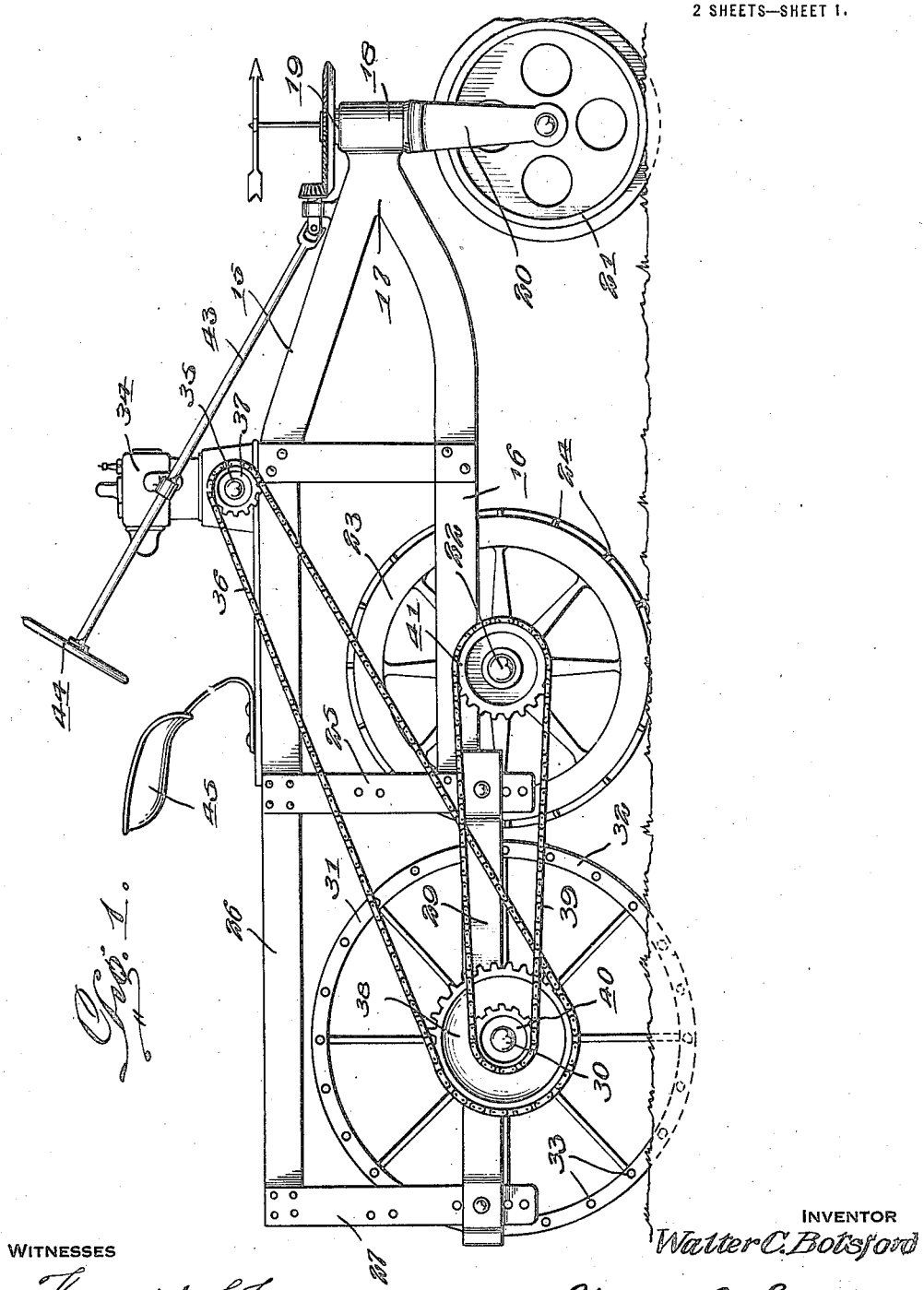
WITNESSES
INVENTOR
Walter C. Botsford
BY Victor J. Evans.
ATTORNEY

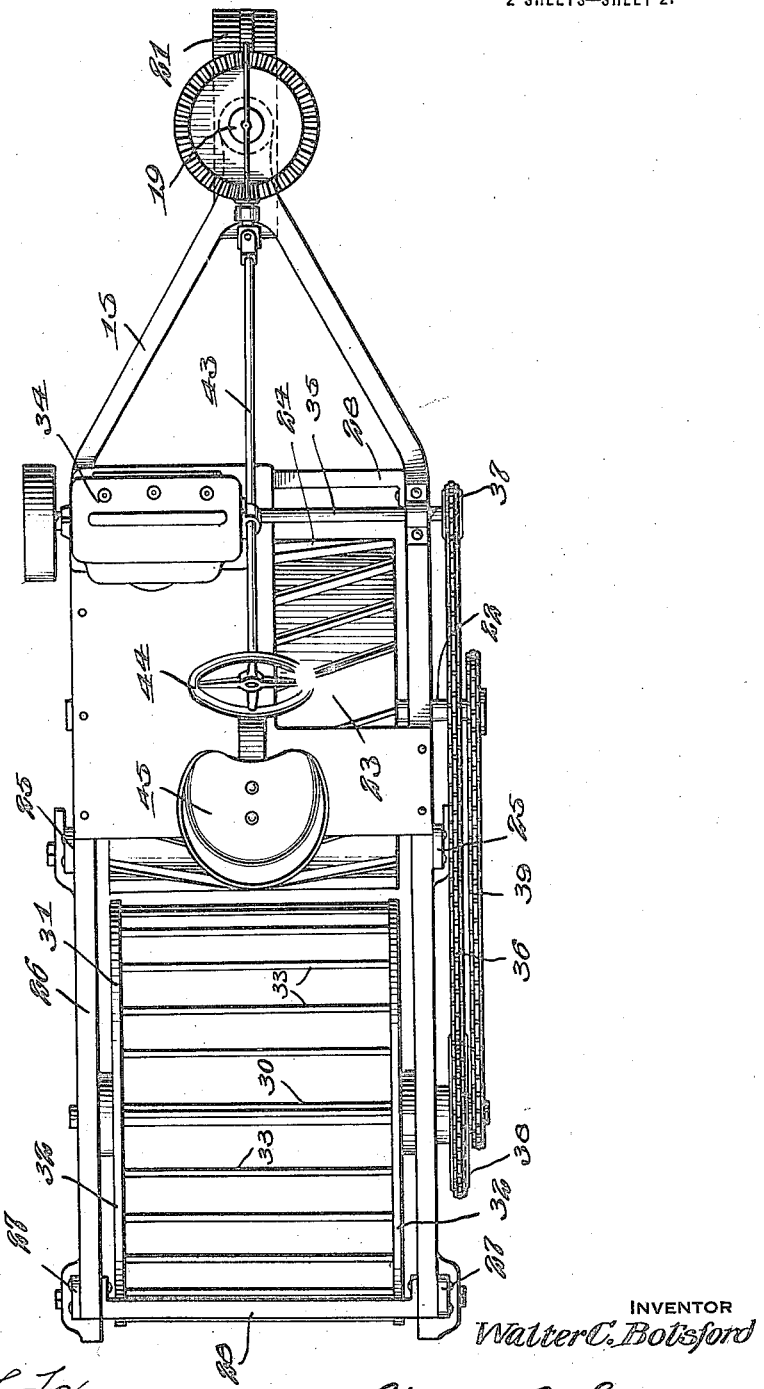

UNITED STATES PATENT OFFICE.

WALTER C. BOTSFORD, OF ELTOPIA, WASHINGTON.

AGRICULTURAL TRACTOR.

1,302,295.  Specification of Letters Patent.  Patented Apr. 29, 1919.

Application filed January 24, 1917. Serial No. 144,239.

*To all whom it may concern:*

Be it known that I, WALTER C. BOTSFORD, a citizen of the United States, residing at Eltopia, in the county of Franklin and State of Washington, have invented new and useful Improvements in Agricultural Tractors, of which the following is a specification.

This invention relates to tractors for agricultural purposes and it has for its object to produce a tractor of simple and improved construction in which one wheel shall be utilized primarily for driving purposes and in which another wheel will be utilized for tilling purposes, it being understood that more than one wheel may be utilized for either of the aforesaid purposes if desired.

A further object of the invention is to simplify and improve the general frame structure and the arrangement of driving and tilling wheels.

A further object of the invention is to simplify and improve the general construction and operation of the organized machine which constitutes the invention.

With these and other ends in view which will readily appear as the nature of the invention is better understood, the same consists in the improved construction and novel arrangement and combination of parts which will be hereinafter fully described and particularly pointed out in the claim.

In the accompanying drawing has been illustrated a simple and preferred form of the invention, it being, however, understood that no limitation is necessarily made to the precise structural details therein exhibited, but that changes, alterations and modifications within the scope of the claim may be resorted to when desired.

In the drawing,

Figure 1 is a view in side elevation of an agricultural tractor constructed in accordance with the invention.

Fig. 2 is a top plan view of the same.

Corresponding parts in both figures are denoted by like characters of reference.

The main frame of the machine includes upper and lower side members 15, 16, the former of which are obliquely and the latter horizontally disposed, said upper and lower members converging forwardly as clearly seen in Fig. 1, their forward ends being connected together by end pieces 17. At the forward end of the frame there is supported a vertical sleeve 18 having bearings for the spindle or journal 19 of the steering fork 20 which carries the steering wheel 21. On the side members 16 are mounted bearings for the shaft or axle 22 carrying the driving wheel 23 the tread of which is of ample width to enable the machine to travel over the ground without danger of tilting or upsetting. On the rim of the driving wheel is provided anti-slipping devices or grouts 24 of any well known construction.

The frame members 15, 16 are connected together at their rearward ends by vertically disposed frame members 25 and extending rearwardly from the frame members 15 are horizontal frame members 26 from the rearward ends of which rear frame members 27 extend downwardly in parallel relation to the frame members 25. Cross bars or braces 28 may be utilized wherever desired to strengthen and reinforce the construction.

Connected adjustably with the vertically disposed frame members 25 and 27 are side bars 29 having bearings for the rear axle or shaft 30 carrying the tilling wheel 31. The side members 29 may be connected with the vertical members 25 and 27 by means of clamps, bolts, or other fastening devices that will permit vertical adjustment of the side members 29 to be effected, it being understood that any well known mechanical means may be utilized for effecting such adjustment without necessitating the removal of bolts or the like.

The tilling wheel, as herein illustrated, is composed of two rims 32 having hubs and spokes, said rims being connected together and spaced apart by cross bars or rods 33 which are designed to cut into the ground below the surface thereof so as to break up the soil and cut the roots of weeds and the like. It is, however, to be understood that the tilling wheel may be constructed or provided with ground engaging knives, cutters, plows, cultivating implements or the like of any desired and appropriate construction which, as the machine advances and the wheel rotates, will cut or dig into the ground, thereby cutting, scoring, turning, pulverizing or otherwise treating the soil to produce any desired effect.

The frame of the machine is equipped with a platform on which is mounted a motor 34 such as an internal combustion engine or other engine having a driven main shaft 35. Motion is transmitted from the main shaft 35 to the shaft 30 of the tilling wheel by means of a belt or chain 36 guided over sprocket wheels 37 and 38 on the respective shafts. Motion is transmitted from the shaft 30 to the shaft 22 of the driving wheel by means of a belt or chain 39 guided over sprocket wheels 40, 41 on the respective shafts, it being understood that by using sprocket wheels of any desired size, any desired ratio may be maintained between the speeds of the respective wheels. It is usually preferred to drive the driving wheel 23 at a speed considerably less than that of the tilling wheel, and by changing the gearing any desired ratio of speed may be had. It is also to be understood that in the transmission gearing clutches and other devices of like nature may be employed for the purpose of starting, stopping, backing and the like, but such devices being well known in tractors and similar machines, no attempt is made to herein particularly describe or illustrate the same. A steering gear is provided including a steering rod 43 and a hand wheel 44 said hand wheel being arranged in convenient proximity to the driver's seat 45.

In the operation of this invention, motion will be transmitted from the engine or motor direct to the tilling wheel and from the axle of the latter to the driving wheel. As the tilling wheel is rotated it will obviously, by engaging the ground, tend materially to assist in driving the machine, the driving wheel serving perhaps in a more accurate sense as a regulating wheel or anti-slipping device whereby the greater speed of the tilling wheel will be rendered effective to cause its earth engaging implements to cut into and below the surface of the ground.

The depth of penetration may be governed by vertically adjusting the side bars 29 carrying the tilling wheel and the steering and proper guiding of the machine may be easily effected by means of the steering wheel at the front end of the machine. The improved agricultural tractor is simple in construction and may be inexpensively operated.

Having thus described the invention, what is claimed as new is:

In an agricultural tractor, a frame having pairs of vertical members at the opposite sides of its rear portion, a driving and regulating wheel having an axle mounted in fixed bearings with which the front portion of the frame is provided, side members having their ends slidably connected to the vertical frame members for vertical adjustments on said vertical frame members, means to hold said side members in adjusted position, a tilling wheel having its axle mounted in bearings with which said vertically adjustable side members are provided, sprocket wheels on the axles of said first named wheels, an endless sprocket chain connecting said sprocket wheels, a motor mounted on the frame and having a driving shaft provided with a sprocket wheel, a sprocket wheel on the axle of the tilling wheel and an endless sprocket chain connecting the last named sprocket wheels, so that the tilling wheel is driven directly by the motor and the driving wheel is driven by power transmitted thereto from the tilling wheel.

In testimony whereof I affix my signature.

WALTER C. BOTSFORD.